A. BENSON.
DRIVING MECHANISM.
APPLICATION FILED FEB. 5, 1916.
1,337,634.
Patented Apr. 20, 1920.
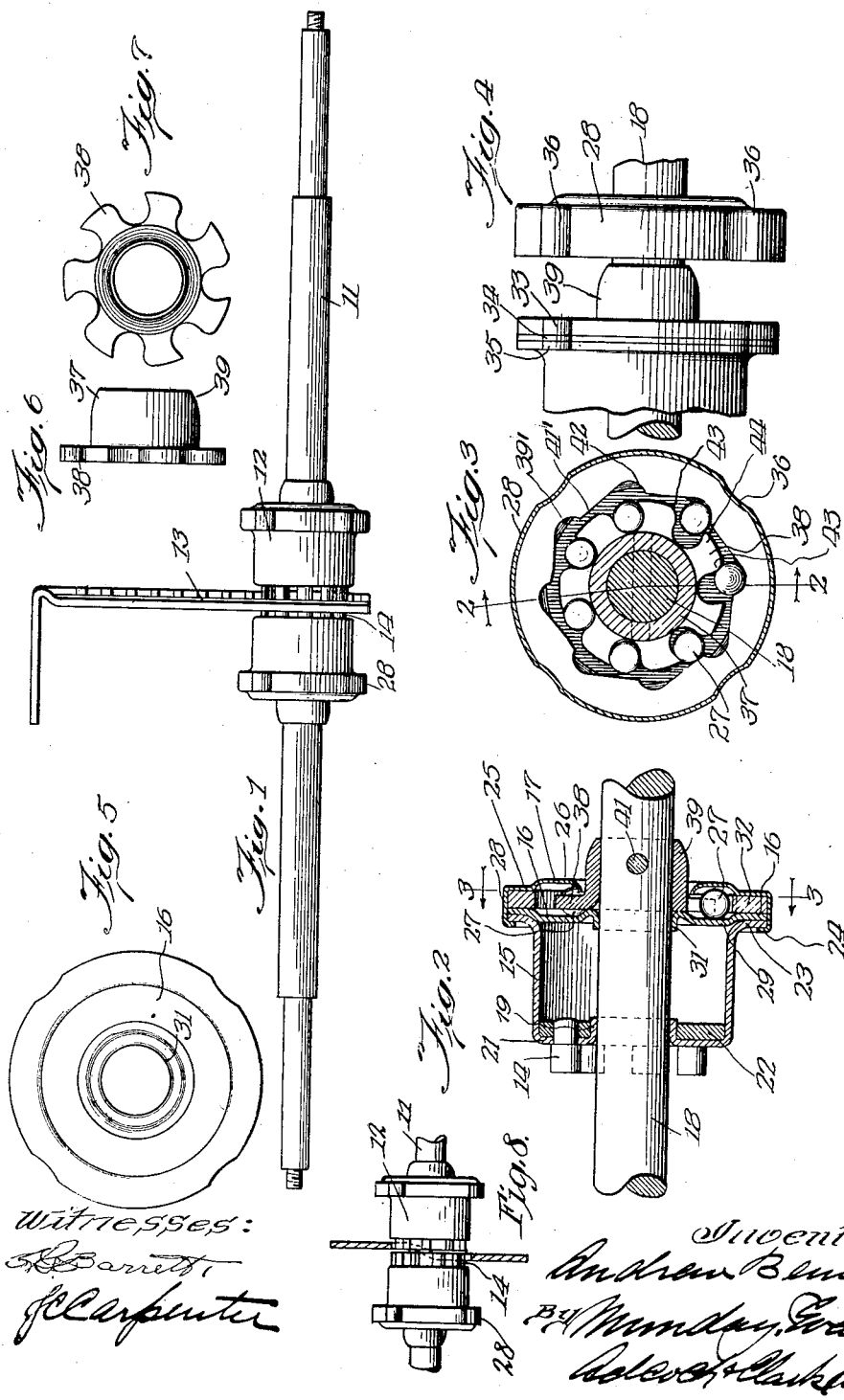

UNITED STATES PATENT OFFICE.

ANDREW BENSON, OF CHICAGO, ILLINOIS, ASSIGNOR, BY MESNE ASSIGNMENTS, TO JANESVILLE PRODUCTS COMPANY, OF JANESVILLE, WISCONSIN, A CORPORATION OF WISCONSIN.

DRIVING MECHANISM.

1,337,634.      Specification of Letters Patent.      Patented Apr. 20, 1920.

Application filed February 5, 1916. Serial No. 76,277.

*To all whom it may concern:*

Be it known that I, ANDREW BENSON, a citizen of the United States, residing in Chicago, in the county of Cook and State of Illinois, have invented a new and useful Improvement in Driving Mechanism, of which the following is a specification.

This invention relates to driving mechanism particularly designed for driving a child's vehicle of the character described in my co-pending application Serial Number 835,602 filed May 1, 1914, although it will be manifest that it may have efficient use in other connections.

An object of this invention is the provision of a driving mechanism of the character indicated which may be readily operated by the user of a vehicle or wagon provided therewith and which, through its construction, will prevent arrangement of the parts on dead center when the vehicle is stopped.

Another object of the invention is to provide such a construction as will propel the axle or driving shaft continuously in one direction regardless of the manner of operation of the vehicle and which will permit coasting.

A further object of the invention is the provision of such a structure constructed wholly or largely of sheet metal stamped parts so constructed as to be strong and durable and as to be readily assembled.

A still further object of my invention is the provision of a driving mechanism comprising a clutch of ratchet type, the parts of which may be arranged to drive in either direction.

Other objects and advantages of the invention will be apparent as it is better understood from the following description when considered in connection with the accompanying drawing illustrating a preferred embodiment thereof.

On the drawings,

Figure 1 is a side elevation of a driving mechanism embodying my present invention;

Figs. 2 and 3 are sections taken at right angles and respectively upon the lines 2—2 and 3—3 of Figs. 3 and 2;

Fig. 4 is a side elevation showing certain details of construction;

Fig. 5 is an end elevation of the same;

Fig. 6 is a side elevation of the inner or driven clutch member;

Fig. 7 is a front elevation thereof; and

Fig. 8 is a view showing the relation between the rack bar and the pinions driven by it.

For the purpose of illustrating my invention I have shown on the drawing a shaft or rear axle 11 upon which are oppositely mounted two driving clutches 12 of new and improved construction and embodying my invention. These clutches receive the power from an oscillating rack 13 adapted to be secured beneath the treadboard (not shown) of the vehicle in the manner described in my co-pending application to which reference has already been made. The clutches 12 are in accordance therewith oppositely mounted upon the shaft and each imparts rotation to the shaft when it is rotated in one direction. Since the clutch members are oppositely mounted and rotate together under the action of the rack 13 operation of the shaft in one direction under one or the other clutch is produced at every movement of the rack and no matter in which direction the rack is moved. The two clutch members 12 are, in the present instance, exact duplicates and a description of one of them will apply equally to the other.

The clutch shown on the drawing receives actuation from a plurality of pins 14 carried in an end of a combined housing and bearing member 15. The member 15 with an inner housing member 16 and an outer housing member 17 constitute the clutch housing and are so constructed and arranged as to provide an elongated bearing upon the shaft or axle 11 at its central part 18 which is disposed through them. To this end the combined housing and bearing member 15 is elongated and turned inwardly at 19 at the end in which the pins 14 are located. These pins extend through the annular end 21 of this member and also through a reinforcing ring 22 within the housing through which they are secured by upsetting or swaging the ends or by otherwise securing them in place. At the other end the member 15 is flanged outwardly at 23 to engage behind a lip or flange 24 on the outer housing member 17. This housing member comprises an end perforated disk or annular portion 25 depressed outwardly near its inner circumference at 26 to provide a widened raceway for antifriction balls 27. The member 17 has a cylindrical flange 28 at the end of which the inwardly extending flange or lip 24 is formed. The flange 23 of the member 15 extends within the cylindrical portion 28 of the member 17 and between the flange 23 and the annular portion 25. In the same space is located the edge of the member 16 which is of general circular form and of diameter equal to the outer diameter of the flange 23. This member is depressed at 29 oppositely and coincidently with the depression 26 of the member 17 to form the opposite side of the raceway for the antifriction balls or devices 27. At its inner edge it is bent to form a bearing flange 31 engaging the shaft and spaced well from the bearing flange 19. Between the member 16 and the annular part 25 of the member 17 a locking disk 32 is secured in place. The parts 15, 16, 17 and 32 which may be considered the driving member of the clutch are held together by recesses 33, 34 and 35 in the parts 32, 16 and 15 respectively, in each of which set of recesses an inward extension 36 formed by depressing the cylindrical part 28 of the member 17 is adapted to seat as may be seen by comparing Figs. 3 and 4. The driven part of the clutch or that part which is fastened to the shaft consists in the present instance of a flanged ball carrying member 37 having a plurality of radially extending lugs 38 adapted to be disposed within the member 32. This ball carrying member has an elongated flange 39 which is pinned or otherwise secured upon the shaft at 41. The depth between the lugs 38 is preferably substantially that of the diameter of one of the balls 27. The inner face of the ring or member 32 is provided with a plurality of pockets 39' having a sloping face 41' rearwardly in the direction of movement of the driving part of the clutch under the action of the rack 13 and an abrupt face 42 forwardly in its direction of movement. These recesses are appropriately formed to cause a ball disposed in one of them to be engaged by the forward corner 43 of a lug 38 at the end of the diameter of the ball, the other end of which is in direct contact with the more abrupt face 42 of a pocket 39'. This face has a curvature approximately that of the ball. The number of pockets in the member 32 is preferably different from the number of pockets in the member 37 so that the balls will be differently positioned at all points about the circumference, the number of balls of course corresponding to the pockets in the member having the lesser number. This provides for a rapid engagement of the clutch in its driving operation, the slightest movement causing all the balls to be thrown outwardly both through gravity and through centrifugal force and the immediate or substantially immediate engagement of a ball between a pair of pockets. All of the parts with the exception of the balls and driving pins 14 are of stamped sheet metal and the parts are assembled by superimposing the parts 15, 16 and 32, positioning the part 38, placing the balls 27 in the pockets and then slipping into place the member 17 and bending down the flange 24. The parts 38 may be pinned to the shaft either before or after the clutch is assembled as may be desired. The clutch is simple and of enduring construction by reason of the fact that engagement with the balls is effected at the ends of a diameter thereby relieving any side thrust upon the parts and avoiding damage to the balls.

The clutch may be arranged to drive in the opposite direction by merely turning over the ring or inner member 32 in which event the points 44 of the lugs will engage the balls at an end of their diameters when in the pockets instead of the corners 43 engaging them. When the parts are arranged as shown in Fig. 3, the sharp or more pointed corners 44 serve to scoop the balls out of the pockets in the ring 38 during operation.

It is thought that the invention and many of its attendant advantages will be understood from the foregoing description, and it will be apparent that various changes may be made in the form, construction and arrangement of the parts without departing from the spirit and scope of the invention or sacrificing any of its material advantages, the form hereinbefore described being merely a preferred embodiment thereof.

I claim:—

1. A clutch comprising a driven shaft, a driven clutch member secured thereto, a driving clutch member and a sheet metal housing inclosing said clutch members and extended to one side a substantial distance, said sheet metal housing having inturned flanges, one located at the end of the extended part to provide an elongated bearing on said shaft.

2. A clutch comprising a driven shaft, a driven clutch member secured thereto, a driving clutch member and a sheet metal housing inclosing said clutch members and extended to one side a substantial distance, said sheet metal housing having inturned flanges, one located at the end of the extended part to provide an elongated bearing on said shaft, said housing being fixed to the driving clutch member, and carrying means at its extended end for receiving power to be transmitted through said clutch.

3. A clutch comprising a cylindrical sheet having an outwardly extending flange at one end, a pocket member and a pair of sheets disposed one on each side of said pocket member to form an anti-friction device raceway, each of said sheets being of stamped metal and one having a flange embracing said pocket member, the other member and the flange on said cylindrical sheet.

4. A clutch comprising a cylindrical sheet having an annular disk end, studs extending through said disk end forming gear teeth, and a plate behind said disk end in which said studs are secured, a driving clutch member receiving power from said housing, and movable therewith, and a driven clutch member adapted for intermittent connection with said driving clutch member.

5. A clutch comprising a plurality of sheet metal parts forming a housing and an elongated bearing, anti-friction and clutching devices within the housing, members in the housing engageable by said clutching devices, said parts also forming a raceway for the anti-friction and clutching devices, one of said parts inclosing portions of the remainder in interlocked engagement.

6. A clutch comprising a plurality of stamped metal parts forming a raceway for anti-friction and clutching devices and forming a housing and elongated bearing, anti-friction and clutching devices and members engageable thereby in said housing, one of said parts having a portion embracing parts of the remainder in contact and in interlocking engagement.

7. A clutch comprising a plurality of stamped metal parts forming a housing, bearing and raceway for anti-friction and clutching devices, anti-friction and clutching devices and members engageable thereby in said housing, one of said parts comprising a disk having a flange extending over the others and registered depressions in the parts embraced and in said flange for forming an interlocking connection.

8. In a clutch the combination of a driven clutch member provided with pockets, anti-friction and clutching members mounted in said pockets, a driving clutch member adapted to engage said clutching members on relative movement in one direction, sheet metal side members forming an anti-friction raceway, and a housing member extending at one side to provide an elongated bearing.

9. In a clutch the combination of a driven clutch member provided with pockets, anti-friction and clutching members mounted in said pockets, a driving clutch member adapted to engage said clutching members on relative movement in one direction, sheet metal side members forming an anti-friction raceway, and a housing member extending at one side to provide an elongated bearing, said housing member, said side members and said driving member being interlocked against separation.

10. In a clutch the combination of a driven clutch member provided with pockets, anti-friction and clutching members mounted in said pockets, a driving clutch member adapted to engage said clutching members on relative movement in one direction, sheet metal side members forming an anti-friction raceway, and a housing member extending at one side to provide an elongated bearing, said housing member, said side members and said driving member being interlocked against separation and against independent rotation.

11. A clutch comprising a driven clutch member provided with pockets, anti-friction and clutching elements in said pockets, a driving member disposed about said anti-friction and clutching elements, a side plate member at one side for restraining lateral movement of said anti-friction and clutching devices, a bearing housing member at the other side, one of said members impressing the other member and the driving clutch member in interlocked relation.

Signed in the presence of two subscribing witnesses.

ANDREW BENSON.

Witnesses:
J. C. CARPENTER,
ESTHER ABRAMS.